United States Patent
Dillinger et al.

(10) Patent No.: US 8,306,009 B2
(45) Date of Patent: Nov. 6, 2012

(54) METHOD OF SELECTING SUITABLE FREQUENCY BANDS FOR DATA TRANSMISSION BETWEEN A NETWORK NODE AND A USER EQUIPMENT WITHIN A MOBILE COMMUNICATIONS NETWORK

(75) Inventors: Markus Dillinger, Oberhaching (DE); Michael Freisinger, Vienna (AT); Jijun Luo, München (DE); Egon Schulz, München (DE); Peter Slanina, Judenau (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 714 days.

(21) Appl. No.: 11/920,854

(22) PCT Filed: May 17, 2006

(86) PCT No.: PCT/EP2006/062371
§ 371 (c)(1),
(2), (4) Date: Dec. 1, 2009

(87) PCT Pub. No.: WO2006/125738
PCT Pub. Date: Nov. 30, 2006

(65) Prior Publication Data
US 2010/0067478 A1    Mar. 18, 2010

(30) Foreign Application Priority Data
May 23, 2005    (EP) .................... 05011143

(51) Int. Cl.
*H04J 1/00* (2006.01)
*H04L 12/28* (2006.01)
*H04L 12/56* (2006.01)
(52) U.S. Cl. ............... 370/343; 370/395.4; 370/480
(58) Field of Classification Search .............. None
See application file for complete search history.

(56) References Cited

U.S. PATENT DOCUMENTS
6,031,827 A * 2/2000 Rikkinen et al. ............. 370/330
(Continued)

FOREIGN PATENT DOCUMENTS
WO    00/51264    8/2000
(Continued)

OTHER PUBLICATIONS

M. Karol et al., "Time-Frequency-Code Slicing: Efficiently Allocating the Communications Spectrum to Multirate Users", IEEE Transactions on Vehicular Technology, 1. Nov. 1997, pp. 818-826.
(Continued)

*Primary Examiner* — Chirag Shah
*Assistant Examiner* — Ashley Shivers
(74) *Attorney, Agent, or Firm* — Staas & Halsey LLP

(57) ABSTRACT

A method of selecting suitable frequency bands for data transmission between a network node and a user equipment within a mobile communications network. A method selects suitable frequency bands for data transmission between a network node and user equipment within a mobile communications network. A scheduler on the network node side selects data transmission mode depending on the user equipment capability of receiving data from at least two frequency bands simultaneously. The scheduler preferably selects the data transmission mode in the following way: simultaneous data transmission over at least two frequency with or without splitting traffic data or data transmission over only one available frequency band. For data transmission, a radio frame structure (Big MAC element) is dynamically established in the so-called medium access control layer, shortened so-called MAC-layer, by using concurrent radio resources from other frequency bands or other radio access technologies.

13 Claims, 4 Drawing Sheets

U.S. PATENT DOCUMENTS

| | | | |
|---|---|---|---|
| 6,374,109 | B1 | 4/2002 | Shaheen et al. |
| 2003/0021245 | A1 | 1/2003 | Haumonte et al. |
| 2003/0148764 | A1 | 8/2003 | Kelley |
| 2003/0153323 | A1 | 8/2003 | Hwang |
| 2004/0002330 | A1* | 1/2004 | Chitrapu .................... 455/426.2 |
| 2004/0258098 | A1* | 12/2004 | Ohkubo et al. ............... 370/503 |
| 2005/0002421 | A1* | 1/2005 | Ito et al. ........................ 370/474 |
| 2005/0143123 | A1* | 6/2005 | Black et al. ................. 455/552.1 |
| 2005/0163093 | A1* | 7/2005 | Garg et al. .................... 370/342 |
| 2006/0199544 | A1* | 9/2006 | Ramakrishna et al. .... 455/67.11 |

FOREIGN PATENT DOCUMENTS

| | | |
|---|---|---|
| WO | 2004/066646 | 8/2004 |

OTHER PUBLICATIONS

K. Rikkinen et al., "WCDMA Scenarios for the 2.5 GHZ IMT-2000 Extension Band Supporting Asymmetric Freqency Allocations", Fourth International Conference on 3G Mobile Communication Technologies, 2003, pp. 294-298.

N. Golmie et al., "Interference aware Bluetooth packet scheduling", Globecom'01, 2001, pp. 2857-2863.

* cited by examiner

METHOD OF SELECTING SUITABLE FREQUENCY BANDS FOR DATA TRANSMISSION BETWEEN A NETWORK NODE AND A USER EQUIPMENT WITHIN A MOBILE COMMUNICATIONS NETWORK

CROSS REFERENCE TO RELATED APPLICATIONS

This application is based on and hereby claims priority to International Application No. PCT/EP2006/06237 filed May 17, 2006 and European Application No. EP05011143 filed on May 23, 2005, the contents of which are hereby incorporated by reference.

BACKGROUND

A method selects suitable frequency bands for data transmission between a network node and a user equipment within a mobile communications network. A network node performs the above mentioned method.

The presented invention is particularly used in the mobile radio communications field.

With respect to UMTS evolution higher transmission rate within the presented licensed frequency bands is required.

Revolutionary air interfaces are proposed which are characterised by higher chip rate crossing multiple UMTS carriers or modulation schemes completely replacing CDMA approach.

An open problem is how to use the existing spectrum to offer higher throughput with reasonable cost.

According to WO 00/51264 a method is known, which is used for implementing downlink diversity in a radio telecommunication system operating according to time divisional multiple access TDMA and including at least one radio transceiver device (and at least on terminal device. The downlink diversity is realized by using frequency and/or time separation.

According to Karol M. J. et al.: "Time-Frequency-Code Slicing: Efficiently Allocating the Communications Spectrum to Multirate Users", IEEE Transactions on Vehicular Technology, IEEE Inc. New York, US, Vol. 46, No. 4, Jan. 11, 1997, pages 818-826 a time-frequency-code slicing technique is known, which allows multiple users with different data rate requirements access to a communications resource in a manner that is cost effective over a wide range of access rates.

According to WO2004/066646 it is known, that traffic is transmitted over different air interfaces as well as an appropriate synchronisation mechanism. That is an early concept for traffic splitting based on semantic traffic splitting and mainly focuses on end synchronisation algorithms. However, more technical features need to be added in order to obtain the full benefits of the so called Radio Multi-homing concept.

A further approach envisages a generic link layer protocol which also allows traffic splitting or traffic diversity through different air interfaces. But this approach is still in a rudimental level.

Different to them a realistic and more concrete solution for the near term UMTS evolution is proposed. A UMTS network with two frequency layers is assumed. The Extension band (at 2.5 GHz) and the Core band (2 GHz) are studied as use cases. However, for both transmitter and receiver cost reason, neighbouring bundling of carriers are in favour.

SUMMARY

The inventors propose a method of selecting suitable frequency bands for data transmission between a network node and a user equipment within a mobile communications network, whereby a scheduler on the network node side selects data transmission mode depending on the user equipment capability of receiving data from at least two frequency bands simultaneously.

Data transmission a radio frame structure (Big MAC element) is dynamically established in the so-called Medium access control layer, shortened so-called MAC-layer, by using concurrent radio resources from other frequency bands or other radio access technologies.

For one user traffic transfer, for instance, after creating a bearer service, the user data are transmitted through two bands. At each transmission time, the scheduler chooses the following variants:

Simultaneous transmission with Traffic splitting over the involved carriers

Simultaneous transmission with redundant traffic over the involved carriers

Switching off some carriers (sleep mode) allowing other users access the radio resource or reducing interference.

The network node transmits an indicator for the selected data transmission mode to a user equipment supporting multi link communication.

The indicator can be transmitted on at least two frequency bands.

This concept is termed MAC multi-homing which has one RLC ID (Radio Link Control Identifier) for a bearer service over at least two bands.

Such a Radio Resource Control Identifier can be used for indicating the selected data transmission mode.

Said single radio resources could be mastered by one frequency band or one radio access technology.

The concurrent radio resources mastered by one frequency band or one radio access technology are higher than the resources offered by its own. From the MAC-layer's point of view this concept is called in the following as "big MAC concept".

To allow fast switching between different frequencies and modes the signalling will be done on MAC layer. On higher layers the resources (e.g. CDMA codes) are reserved. The MAC performs a fast scheduling depending on the e.g. load and interference. MAC scheduling will be done very fast. On a time base of one or a few frames it is signalled to the User equipment which mode (single frequency, parallel transmission or diversity) and which frequency has to be used.

To make the protocol robust against interference the signalling can be transmitted on both frequencies. If e.g. a DL signalling to command the user equipment to the other frequency is lost the user equipment will get the information in the next frame when it is transmitted on both frequencies.

A network node, particularly in form of a so-called NodeB, comprising means, especially scheduler means, for performing the above mentioned method.

The following novelties have to be mentioned:

Method of choosing available and suitable frequency bands for User Equipment (UEs) allowing traffic splitting without change of physical layer protocol Scheduler works on multi-frequency layer of UMTS FDD (Universal Mobile Telecommunications System Frequency Division Duplex) according to their quality indication. For users with relatively good connections, traffic splitting is applied.

Joint transport block setting to ease mapping to physical channels and ARQ (Automatic Repeat reQuest)

More intelligent MAC concept compared to current solutions

Allowing retransmission through the most suitable frequency band, not necessarily the old band Good performance: possible gains are: trunking gain for the overall system; diversity gain when same information are transmitted over different links; multiplexing gain when traffic are split over radio links; interference reductions gain. Furthermore end user does not need to completely replace his/her old receiver. If one uses UMTS PCMCIA card, a new one should be inserted and both run in a parallel way.

Cost reduction: No complete replacement of hardware, radio protocol down to the MAC layer mechanism can be proceeded through software download.

Backward compatibility: legacy terminal is also supported by the system.

Easy to be standardized: This proposed method requires acceptable modifications.

At least from the introduction of high speed data channel to the 4G are completely deployed.

BRIEF DESCRIPTION OF THE DRAWINGS

These and other objects and advantages of the present invention will become more apparent and more readily appreciated from the following description of the preferred embodiments, taken in conjunction with the accompanying drawings of which:

The FIG. 1 illustrates parallel transmissions for selected user packets, the FIG. 2 depicts UTRAN MAC-hs architecture with two Downlink channels using two bands, the FIG. 3 shows MAC-hs format for traffic split and the FIG. 4 illustrates a flow chart regarding the so called JGSPTTF algorithm.

DETAILED DESCRIPTION OF THE DRAWINGS

Figure 1:
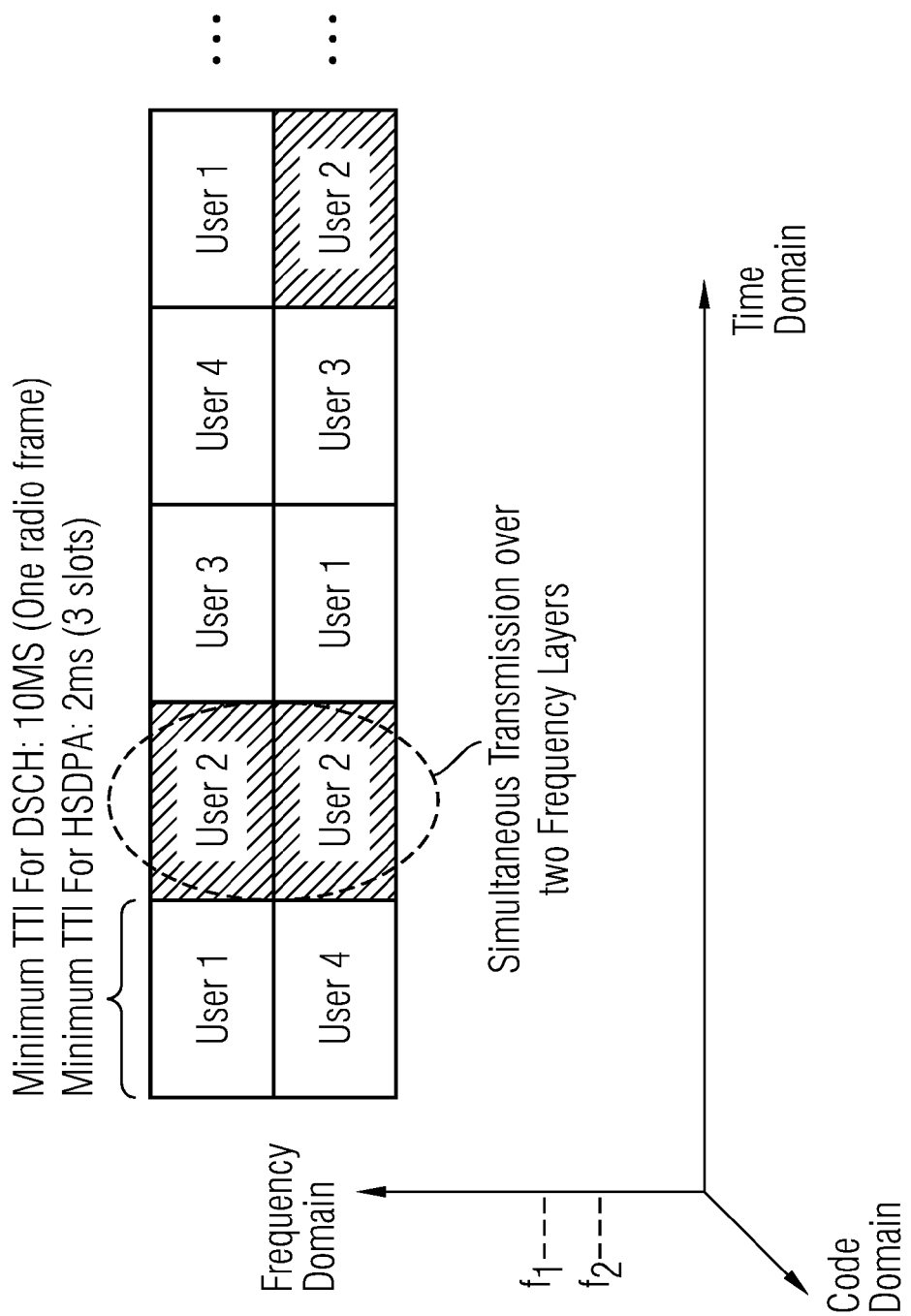

Reference will now be made in detail to the preferred embodiments of the present invention, examples of which are illustrated in the accompanying drawings, wherein like reference numerals refer to like elements throughout.

Functional Architecture:

The FIG. 1 shows for example the data scheduling for multi-user traffic over two frequency layers f1 and f2.

The proposed algorithm can be applied for a network with at least two frequency layers, where the physical location of the antennas (RF heads) can be either co-located or separated. The principles of terminal receiving simultaneous links can be applied both in circuit switched services and packet switched services. The HSDPA (High Speed Downlink Packet Access) with two frequency bands is adopted as a typical scenario describing the proposal.

Figure 2:
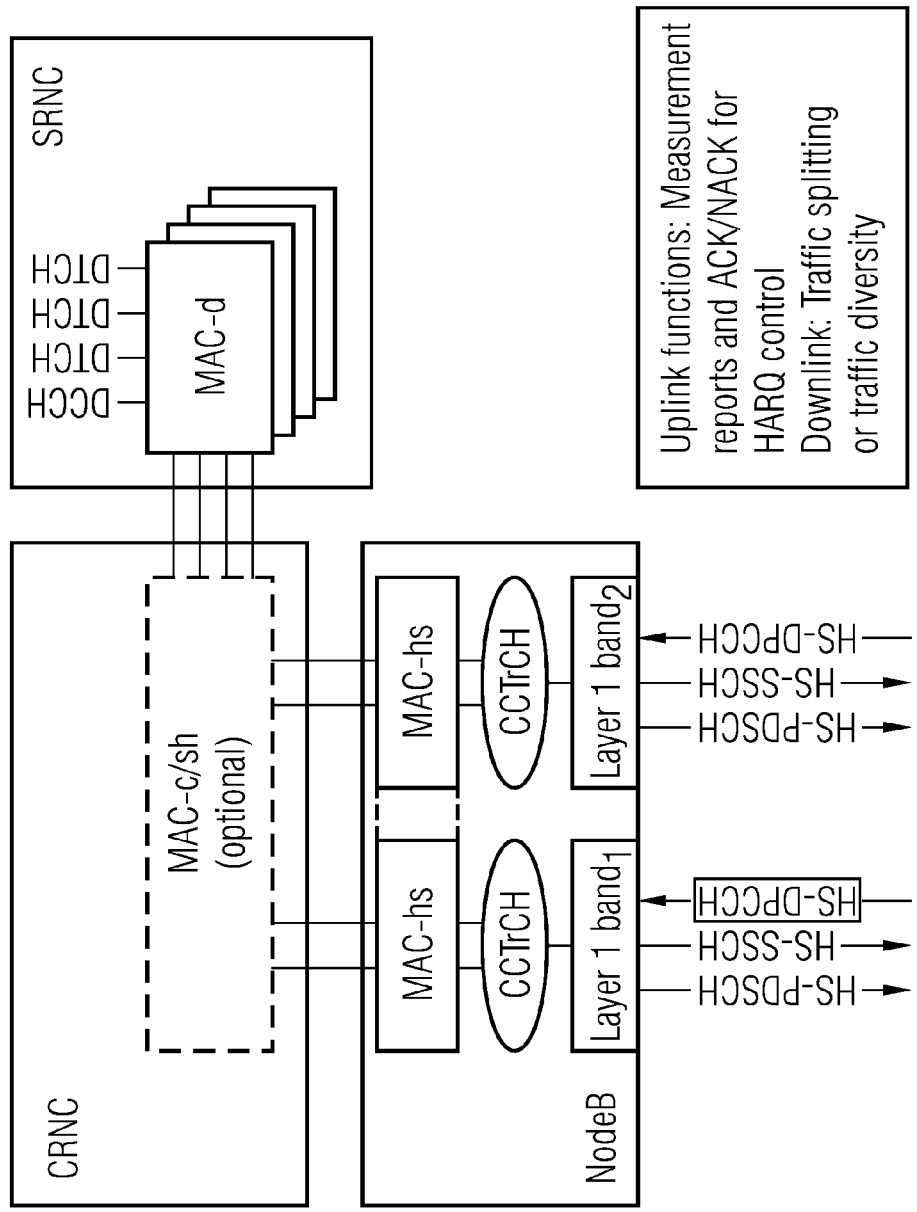

The FIG. 2 shows a possible MAC architecture for a Node B with two frequency bands and with one HSDSCH (High Speed Downlink Shared Channel) in each frequency band respectively.

In FIG. 2 network nodes like Serving Radio Network Controller SRNC, Controlling Radio Network Controller CSRNC and NodeB NodeB are illustrated. In each Network node a typical UMTS protocol layer architecture is shown.

Dual-link mobiles will be able to receive both HSDSCHs simultaneously. In the following, the procedure triggering the traffic splitting manage the traffic being split, Traffic diversity as an option of the simultaneous transmission as well as concurrent single link reception. For optimal link adaptation purpose, one independent uplink control connection is necessary for each HS-DSCH. All these uplink control connections could be multiplexed into a single physical channel per user equipment (HS-DPCCH=High Speed Downlink Packet Control Channel) or each may be carried by a separate physical channel.

Procedure/Signalling and Algorithm:

Suppose the terminal is able to receive signals from two available frequency bands ($F_A$ and $F_B$) respectively. The network Radio resource control (RRC) function is able to define different sub-modes for the connected mobile terminal in the connected mode, namely, connection in both with traffic splitting, connection only in frequency $F_A$, connection only in frequency band $F_B$, and traffic diversity sub-mode. Those four sub-modes are under the connected RRC mode. The sub-mode is selected according to the proposed algorithm irrespective to the RLC mode.

The network decides for the UE the proper RRC sub-mode according to the UEs measurement report in the uplink or from the on-going performance experienced by the UE.

In each scheduled time when the UE is about to receive data from the network, the UE must decode the RRC sub-mode indicators sent from the network first in order to decode, de-multiplex and reorder the received data correctly. The sub-mode indicators are shown in the table as an example:

TABLE 1

RRC sub-mode indicators and the indicated sub-modes

| RRC Sub-mode Indicator | Sub-mode |
| --- | --- |
| 00 | Connection in both frequency band with traffic splitting (with different contents in both links) |
| 01 | Connection only in $F_A$ |
| 10 | Connection only in $F_B$ |
| 11 | Traffic diversity (with the same content and same transport block) |

Due to the simultaneously transmitted HS-SCCH channel (High Speed-shared control channel) in parallel with HS-PDSCH (High speed-Physical downlink shared channel), the RRC sub-mode indicator can be placed in both HS-SSCH channels when applicable. The redundant information is for higher reception success rate. In the following, four sub-modes are described respectively.

For a legacy terminal, the network does not send the RRC sub-mode indicator to the terminal. In this case, only the classical HSDPA protocol is applied.

Figure 3:
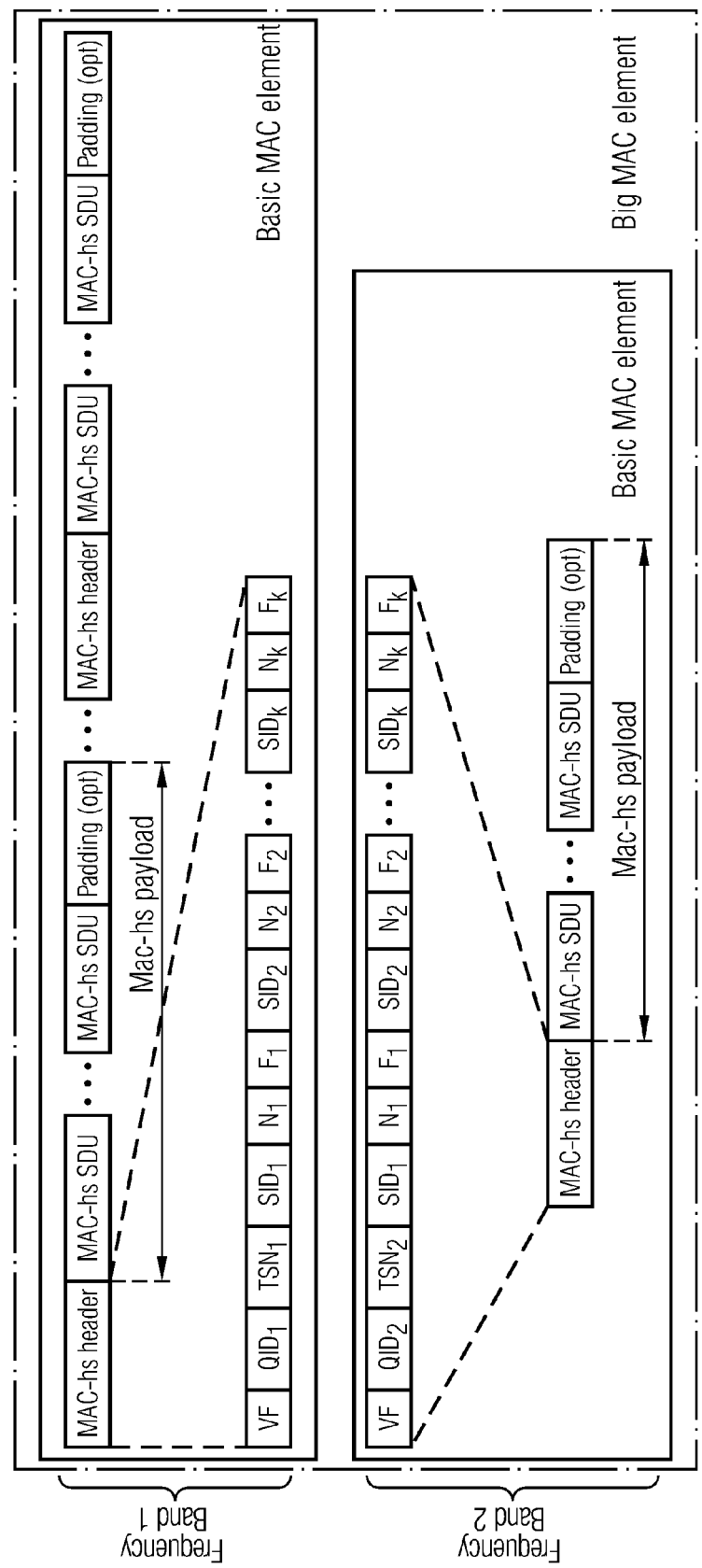

Traffic Split Using the Proposed Method:

Only the first sub-mode (00) uses the so called 'big MAC' format, as depicted in the FIG. 3.

There are two frequency bands 1 and 2 which comprises two Basic/Big MAC elements.

The Big MAC format has a big MAC element with two 'Basic MAC Elements', which are identical to the known HSDPA MAC format. QID indicates the Queue ID, for the purpose of re-ordering data for different buffers. In the proposed 'Big MAC' concept, the network is able to schedule data through different frequency bands simultaneously. As shown in FIG. 3, if the data blocks are taken from different queues, i.e. $QID_1 \neq QID_2$, and $TSN_2$ are set according to previous transmission of this UE. If the data blocks are taken from the same queue, i.e. $QID_1=QID_2$, the sequence number of two MAC PDUs are consecutive, i.e., $|TSN_1-TSN_2|=1$.

Either to choose the data from the same or different queue, depends on the traffic management policy. If the user traffic is agnostically split, same queue ID will be fulfilled. On the contrary, if the policy based traffic split is applied, different queue ID can be set.

Traffic Through Single Frequency Band and Diversity:

In case the network decides the user traffic is sent through one of the available frequency band only, the MAC-hs format is identical to the classical HSDPA specification. In that case, there is only one Basic MAC element necessary.

If the connections are bad in both links, the fourth sub-mode is selected. In that case, same transmission block size is preferred to ease the re-ordering of user traffic. Therefore, single basic MAC element is also sufficient.

The bad connection can be identified from the uplink measurement report or from historical performance observations, e.g. very high retransmission rate for a long time.

When the traffic diversity sub-mode is selected, it is up to the terminal to implement the reception technique. It can either follow the diversity in base band signal, or use MAC layer diversity in terms of choosing the correct SDU after CRC checksum.

Figure 4:
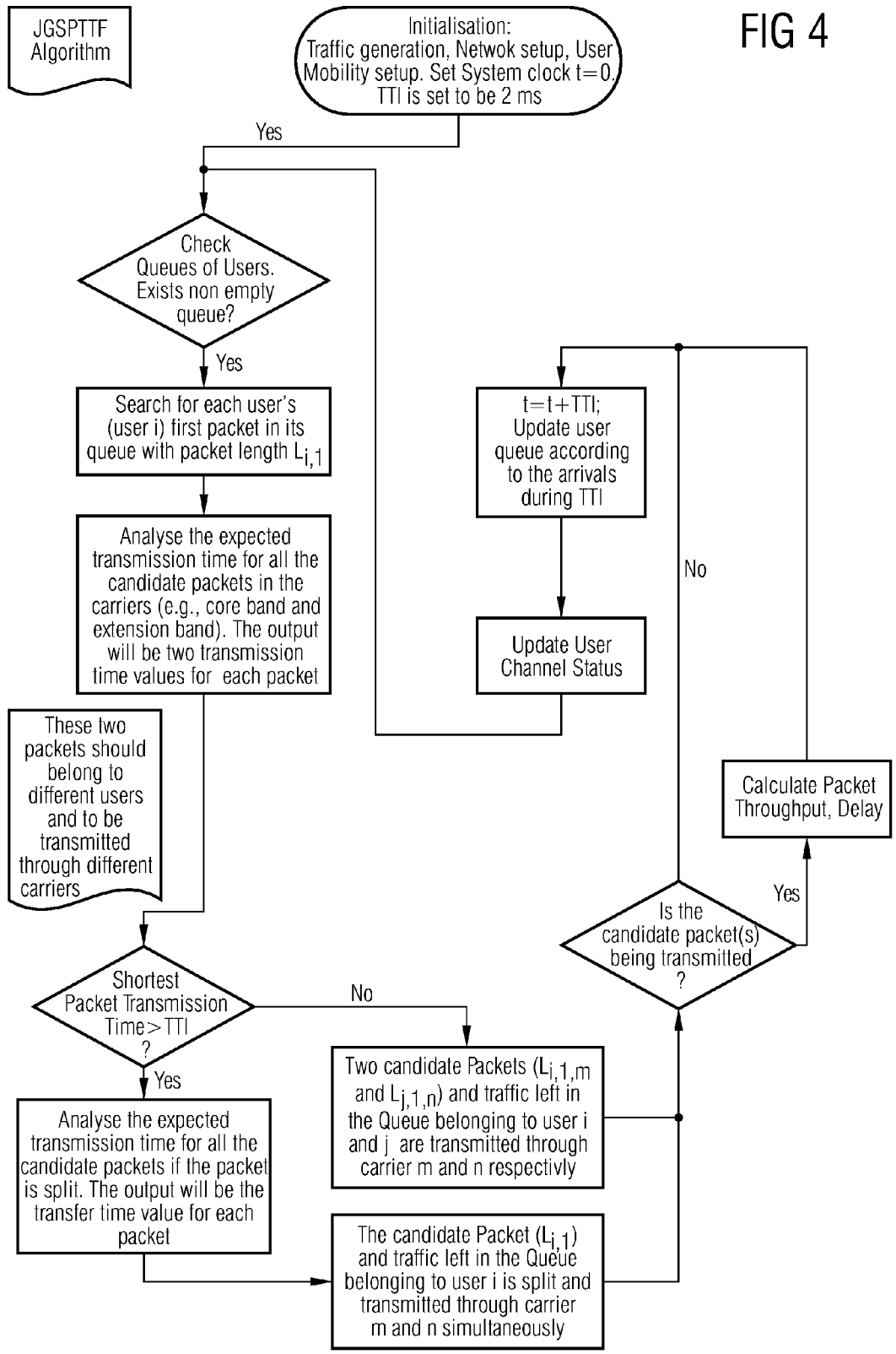

A scheduling algorithm, namely Joint Greedy Shortest Packet Transmission Time First (JGSPTTF) for two frequency layers is proposed. As depicted in FIG. 4, at each scheduling period, this algorithm selects two user packets with the minimum transmission time by evaluating the channel capacity from both frequency layers. At this step, all packets are assumed to be transmitted through individual frequency layer. If none of them can be finished within a TTI (TTI=transmission time interval), the scheduler will select the packet with the minimum transmission time assuming all packets can be split over frequency layers.

Other Issues

Retransmission

Retransmission of the PDUs (packet data units) requested to be retransmitted should be smaller than the system capacity defined transport block. If the size is still bigger, the frequency band with higher capacity will be chosen. Due to the given TSN and Queue ID, it is not necessary to use the old frequency band for retransmission.

Synchronization

Synchronisation between two frequency layers is not necessary. The maximum discrepancy can be loosely defined according to the QoS (Quality of Service) constraint given by the maximum service delay and the buffer capacities. The intra-cell transmissions of different radio channels must be synchronised to reduce the intra-cell interference.

Performances

Using a proposed joint scheduling algorithm specially designed for the big MAC concept gives more than 100% throughput gain compared to the known system.

Supporting more than two carriers: If the terminal capability allows, and the supporting signalling is properly designed, the shown advantages by this proposal will be immediately inherited by RMH for bundling of carriers (≧2). The currently discussed UMTS extension band (2.5 GHz to 2.69 GHz) is a typical application scenario.

Applications for Multi-RAT: the concept can be applied for multiple air interfaces, not necessarily restricted in the domain of UMTS.

Single-link UEs will profit from the trunking gain provided by two downlinks. The faster one can switch between the bands, the higher this gain will be.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method of selecting suitable frequency bands for data transmission between a network node and a user equipment supporting multi-link communication within a mobile communications network, comprising:
   reporting a user equipment capability of receiving data from at least two frequency bands simultaneously to the network node;
   selecting a data transmission mode by a scheduler at the network node side, whereby the selection depends on the reported user equipment capability;
   providing a radio frame structure for data transmission through the at least two frequency bands simultaneously, the radio frame structure providing one High Speed Downlink Shared Channel in each of the at least two frequency bands;
   dynamically establishing said radio frame structure in a so-called Medium Access Control layer, by using concurrent radio resources from different frequency bands or from different radio access technologies; and
   traffic splitting by simultaneously transmitting different data content on each of the High Speed Downlink Shared Channels in each of the at least two frequency bands.

2. A method as claimed in claim 1, wherein the network node transmits an indicator for the selected data transmission mode to a user equipment supporting multi link communication.

3. A method as claimed in claim 2, wherein the indicator is transmitted on at least two frequency bands.

4. A method as claimed in claim 3, wherein a Radio Resource Control Identifier is used for indicating the selected data transmission mode.

5. A method as claimed in claim 1, wherein the scheduler selects the data transmission mode in the following way:
   simultaneous data transmission over at least two frequencies with or without splitting traffic data or
   data transmission over only one available frequency band.

6. A method as claimed in claim 1, wherein the Network Radio Resource Control function of the so called UMTS radio transmission protocol is used to define the data transmission mode.

7. A method as claimed in claim 1, wherein the user equipment is suitable for splitting traffic data without any change of physical layer protocol.

8. A method as claimed in claim 1, wherein the scheduler selects data transmission mode depending on data transmission quality indication.

9. A method as claimed in claim 1, wherein a quality indication is represented by data rate.

10. A method as claimed in claim 1, wherein a quality indication is represented by expected transmission time value.

11. A method as claimed in claim 1, wherein said single radio resources are mastered by one frequency band or one radio access technology.

12. A network node for selecting suitable frequency bands for data transmission between the network node and a user equipment supporting multi-link communication within a mobile telecommunications network, comprising:
   a receiver configured to receive reports regarding a user equipment capability of receiving data from at least two frequency bands simultaneously;

a scheduler configured to select a data transmission mode depending on the user equipment capability;

a Medium Access Control layer in which a radio frame structure for data transmission through which the at least two frequency bands simultaneously can be dynamically established by using concurrent radio resources from different frequency bands or from different radio access technologies, the radio frame structure providing one High Speed Downlink Shared Channel in each of the at least two frequency bands; and a transmitter configured to split traffic by simultaneously transmitting different data content on each of the two High Speed Downlink Shared Channels in each of the at least two frequency bands.

13. A user equipment supporting multi link communication for data transmission within a mobile telecommunications network, comprising:

a transmitter configured to report, to a network node, the user equipment's capability of receiving data from at least two frequency bands simultaneously; and a receiver configured to receive data, the data being transmitted using a Medium Access Control layer in which a radio frame structure for data transmission through which at least two frequency bands simultaneously can be dynamically established by using concurrent radio resources from different frequency bands or from different radio access technologies, the radio frame structure providing one High Speed Downlink Shared Channel in each of the at least two frequency bands, wherein the receiver is further configured to receive split traffic, the traffic being split by simultaneously transmitting different data content on each of the two High Speed Downlink Shared Channels.

* * * * *